J. DAY.
Bean-Rake.
No. 18,576.
Patented Nov. 10, 1857.
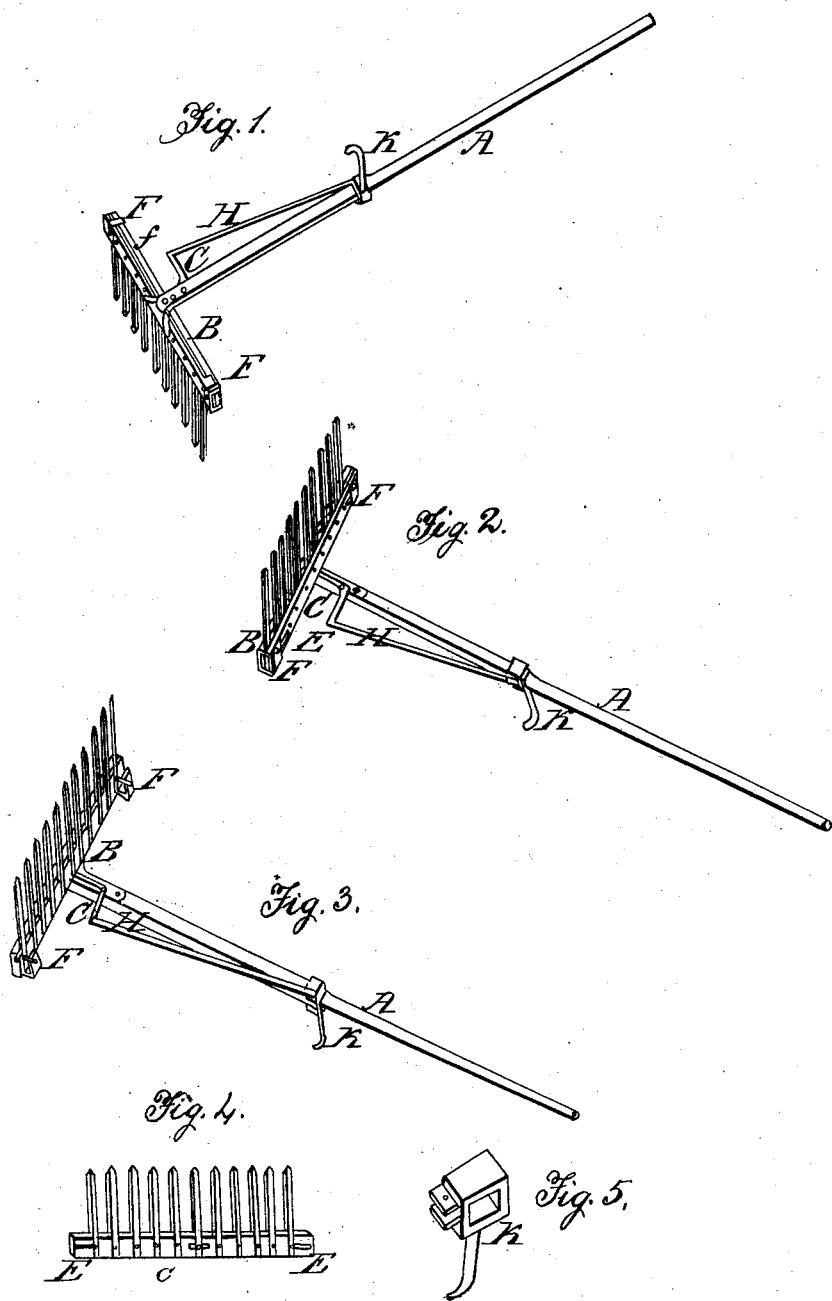

UNITED STATES PATENT OFFICE.

JUSTUS DAY, OF MURRAY, NEW YORK.

IMPROVEMENT IN MACHINES FOR PULLING BEANS.

Specification forming part of Letters Patent No. 18,576, dated November 10, 1857.

*To all whom it may concern:*

Be it known that I, JUSTUS DAY, of the town of Murray, county of Orleans, State of New York, have invented new and useful Improvements in a Machine for Pulling Beans, Flax, &c.; and I do hereby declare that the following is a full, clear, and exact description of the construction and operation of the same, reference being had to the annexed drawings, making part of this specification.

My invention consists in a rake made in the usual form of a garden or hay rake, with the rake-head in two parts, with an equal number of teeth in each part, so arranged that one part slides on the other.

Figures 1 and 2 are perspective views of the machine, Fig. 1 showing the back or upper side and the manner of attaching the stale to the head, Fig. 2 showing the under side and the manner of operating the movable portion of the head. Fig. 3 shows the machine with the upper portion of the head taken off. Fig. 4 is a view of the upper portion of the head with the teeth attached thereto; Fig. 5, a view of handle or nib by which the movable portion of the head is operated.

The stale A is attached to the head B by means of a strap or plate of iron or other metal, which is bolted or riveted to the front or under side of the stale and bent over and attached to the rake-head. The adjustable part of the head C is attached to the other part of the head B by means of bolts in the slots E E. The bands or straps F F are put onto the ends of the head with the bolts passing through them, in order to hold the two parts of the head firmly to their places without being pressed together. The adjustable part of the head C is moved back and forth by means of the crooked lever c, one end of which is attached to the center of the head C and the other end to the rod H, and works on a fulcrum on the stale A. The other end of the rod H is attached to the handle or nib K. The handle K slides up and down on the stale A. The teeth are made of iron or steel, (but may be made of wood, but not as good,) and are made from four to six inches long and half or three-fourths of an inch broad, and thick enough to give the desired strength. The teeth are made without any taper to about three-fourths of an inch to the point. The teeth are placed on the head an inch and a fourth or inch and a half apart in each section of the head, and when the handle K is down to its lowest point on the stale the teeth in each section of the head are exactly over each other. In this position the rake is thrown into the beans or whatever is to be pulled. Then the operator pulls up the handle K, which causes the movable portion of the rake-head to slide, and whatever is between the teeth is bound fast.

What I claim as my invention, and desire to secure by Letters Patent, is—

The movable head, arranged and operated substantially as herein described, for the purpose set forth.

JUSTUS DAY.

Witnesses:
   A. HUFF,
   E. WILCOX.